Patented Aug. 21, 1934

1,971,112

UNITED STATES PATENT OFFICE 1,971,112

METHOD OF PREPARING ORES FOR REDUCTION

Charles G. Maier, Berkeley, Calif., assignor to Thomas B. Swift, Martinez, Calif.

No Drawing. Application August 28, 1933, Serial No. 687,241

4 Claims. (Cl. 75—14)

This invention provides a method for preventing the sticking, sintering and agglomeration of ores during reduction thereof to the metallic state at temperatures below the melting points of the respective metals. It relates principally to the production of so-called sponge metals, and is especially suited for use in the manufacture of sponge iron from soft iron ores and from pyrite cinders.

In past practice in the production of sponge metals, and particularly sponge iron, the tendency for the reduced metallic particles to weld to each other, or to the furnace walls, has been a serious hindrace to many ambitious attempts to commercialize various reduction processes. In the case of refractory lined kilns the ore during transition through the ferrous oxide stage has a tendency to slag with the refractory materials, and upon further reduction to metal, the particles of sponge metal tend to ball up and otherwise impede the natural flow of ore through the kiln. In the case of furnaces constructed of alloy metals, sticking to the walls becomes serious as soon as the external surface of the ore particles is reduced to metal.

My invention is based upon the discovery that this sticking, sintering or agglomerating action may be practically completely eliminated if the individual particles of ore are coated with an adherent film of an alkaline earth metal oxide or hydroxide.

In order to carry out my invention I first roast or calcine the ore in all cases where acidic or metalloidal materials are present which would contaminate the product with undesirable impurities that would be retained by the alkaline earth metal oxide coating. Thus, for example, typical pyrite cinders may contain from 0.5 to 2.0% sulphur, due to incomplete burning in the acid making process. It has been proposed in the past that granular lime be mixed with the sponge iron charge in order to effect the separation of such sulphur content. In this case the lime accepts the sulphur of the unburned pyrite, probably as calcium sulphide, and after reduction, the iron particles, being freed from the lime particles by magnetic means, are found to have lost a considerable portion of the sulphur content. This procedure does not, however, appreciably improve the charge with respect to its tendency to stick, sinter or agglomerate, since the lime has been added as separate granules and can afford only minor protection against sintering or welding. In my process, on the other hand, the ore is given a preliminary roast to remove sulphur or metalloids in order that these materials may not be retained by the alkaline earth metal oxid coating, which, as will be apparent, cannot be effectively separated by magnetic means after the reduction.

After removal of the acidic or metalloidal materials by calcination, I cool the ore and spread it on trays or pass it into a suitable mixing device, such as a conventional concrete mixer, where I wet it with regulated quantities of a fine suspension or solution of hydrated alkaline earth metal oxide. The quantity used depends upon the grain size of the ore. Thus in the case of ore of grain sizes between 4 and 16 mesh, I may use 20% of its weight of a suspension prepared by hydrating 5 to 8 parts by weight of quick lime with 90 to 100 parts by weight of water. For ore of 16 to 40 mesh, 22% of the suspension would be suitable. For still finer ore the quantity should be increased up to 25 to 30%. This increase in the quantity of suspension with increasing fineness of ore is necessary because the finer the ore is the greater is its ratio of surficial area to volume, and the object of the treatment is to produce an effective film of alkaline earth metal oxide upon the particles.

After addition of the suspension or solution of hydrated alkaline earth metal oxide the ore is thoroughly mixed and dried, which may be either by air drying upon mixing trays or by any conventional type of rotary drier such as is used for coal and other materials.

In adding the suspension or solution of hydrated alkaline earth metal oxide I particularly avoid adding enough of it to produce a slurry. If a dense ore or dense pyrite cinder is being treated, smaller quantities of suspension or solution are required. Too little of the suspension or solution causes incomplete coating, and too much causes a pasty or slurry-like mass to be formed, which cannot be properly mixed. Under proper additions the mixture has, during the mixing operation, the consistency of the ordinary brown sugar of commerce, or of non-plastic refractories used for tamping only.

The liquid part of the hydrated alkaline earth metal oxide suspension penetrates into the capillaries of the ore or cinder, leaving the solid portions as an external film. Not more liquid must be added than can be taken up naturally by the said capillaries. During the drying operation the capillary action reverses itself and the dissolved hydrate carried into the capillaries is deposited as an efflorescence upon the outer surface of the ore or cinder particles.

When the ore has been partially or completely dried it may be fed directly to the reducing furnace and reduced without sticking, sintering or agglomerating. The small amount of lime present (generally less than 2%) in the iron or other metal sponge product has a beneficial effect upon subsequent melting operations when the sponge is used for making ferrous alloys or steel, since it then serves as flux for the silicious impurities which are always present in materials such as ores or pyrite cinders.

The protective action of the alkaline earth metal oxide is not entirely mechanical, for the coating produced is usually too thin to have any marked effect upon the mechanical properties of the ore. The beneficial action of the coating may be explained by the theory that a ferrite compound is formed at the surface of the particles and this ferrite formation changes the structure and strength of the outer layers in an advantageous way.

Any alkaline earth metal oxid in suspended or dissolved form may be used, or any other basic material capable of forming ferrites of the desired mechanical properties. Zinc oxide is an example of such material. Naturally only those oxides which are infusible are applicable. For economic reasons I prefer to use quick lime or calcium oxide, but in special cases other members of this class of materials which may prove available or economic, or more suitable for the subsequent utilization of the product, may be used.

I claim:

1. The preparation of an ore for reduction at temperatures below the melting point of the resulting metal which comprises coating the surfaces of its particles with a film of a hydrated alkaline earth metal oxide.

2. The preparation of an ore containing ferric oxid for reduction at temperatures below the melting point of the resulting metal which comprises forming on the surfaces of its particles a protective film of a ferrite of a basic metal oxide.

3. The method of preparing ores for reduction at temperatures below the melting point of the resulting metal which consists in wetting said ores with controlled quantities of suspended or cinting or roasting said cinders to remove subsequently drying said wetted ores to produce a protective film upon the surfaces of the ore particles.

4. The method of preparing pyrite cinders for reduction to sponge iron which consists in calcinating or roasting said cinders to remove substantially all acid and metalloidal materials, wetting said cinders with a suspension of hydrated lime in controlled amount to produce a protective film, and drying said wetted cinder to fix and strengthen the protective film before subjecting same to a reduction process.

CHARLES G. MAIER.

When the ore has been partially or completely dried it may be fed directly to the reducing furnace and reduced without sticking, sintering or agglomerating. The small amount of lime present (generally less than 2%) in the iron or other metal sponge product has a beneficial effect upon subsequent melting operations when the sponge is used for making ferrous alloys or steel, since it then serves as flux for the silicious impurities which are always present in materials such as ores or pyrite cinders.

The protective action of the alkaline earth metal oxide is not entirely mechanical, for the coating produced is usually too thin to have any marked effect upon the mechanical properties of the ore. The beneficial action of the coating may be explained by the theory that a ferrite compound is formed at the surface of the particles and this ferrite formation changes the structure and strength of the outer layers in an advantageous way.

Any alkaline earth metal oxid in suspended or dissolved form may be used, or any other basic material capable of forming ferrites of the desired mechanical properties. Zinc oxide is an example of such material. Naturally only those oxides which are infusible are applicable. For economic reasons I prefer to use quick lime or calcium oxide, but in special cases other members of this class of materials which may prove available or economic, or more suitable for the subsequent utilization of the product, may be used.

I claim:

1. The preparation of an ore for reduction at temperatures below the melting point of the resulting metal which comprises coating the surfaces of its particles with a film of a hydrated alkaline earth metal oxide.

2. The preparation of an ore containing ferric oxid for reduction at temperatures below the melting point of the resulting metal which comprises forming on the surfaces of its particles a protective film of a ferrite of a basic metal oxide.

3. The method of preparing ores for reduction at temperatures below the melting point of the resulting metal which consists in wetting said ores with controlled quantities of suspended or cinting or roasting said cinders to remove subsequently drying said wetted ores to produce a protective film upon the surfaces of the ore particles.

4. The method of preparing pyrite cinders for reduction to sponge iron which consists in calcinating or roasting said cinders to remove substantially all acid and metalloidal materials, wetting said cinders with a suspension of hydrated lime in controlled amount to produce a protective film, and drying said wetted cinder to fix and strengthen the protective film before subjecting same to a reduction process.

CHARLES G. MAIER.

CERTIFICATE OF CORRECTION.

Patent No. 1,971,112.            August 21, 1934.

CHARLES G. MAIER.

It is hereby certified that error appears in the printed specification of the above numbered patent requiring correction as follows: Page 2, line 93, claim 3, strike out the syllable and words "cinting or roasting said cinders to remove" and insert instead dissolved hydrated alkaline earth oxides and; and that the said Letters Patent should be read with this correction therein that the same may conform to the record of the case in the Patent Office.

Signed and sealed this 17th day of September, A. D. 1935.

Leslie Frazer (Seal)            Acting Commissioner of Patents.